United States Patent
Nakao et al.

(10) Patent No.: US 6,802,224 B2
(45) Date of Patent: Oct. 12, 2004

(54) ARCH-SHAPED TUBE TYPE CORIOLIS METER AND METHOD FOR DETERMINING SHAPE OF THE CORIOLIS METER

(75) Inventors: Yuichi Nakao, Tokyo (JP); Seiji Kobayashi, Tokyo (JP); Norio Sukemura, Tokyo (JP); Yutaka Ogawa, Tokyo (JP); Shingo Gomi, Tokyo (JP); Katsuichi Uchida, Tokyo (JP)

(73) Assignee: Oval Corporation, Tokyo (JP)

( * ) Notice: Subject to any disclaimer, the term of this patent is extended or adjusted under 35 U.S.C. 154(b) by 0 days.

(21) Appl. No.: 10/415,257
(22) PCT Filed: Jun. 25, 2002
(86) PCT No.: PCT/JP02/06315

§ 371 (c)(1),
(2), (4) Date: Apr. 25, 2003

(87) PCT Pub. No.: WO03/029761

PCT Pub. Date: Apr. 10, 2003

(65) Prior Publication Data

US 2004/0040387 A1 Mar. 4, 2004

(30) Foreign Application Priority Data

Sep. 21, 2001 (JP) ........................................ 2001-288260
Dec. 18, 2001 (JP) ........................................ 2001-383936

(51) Int. Cl.[7] .............................................. G01F 1/84
(52) U.S. Cl. .............................................. 73/861.354
(58) Field of Search .................... 73/861.354, 861.355, 73/861.356, 861.357

(56) References Cited

U.S. PATENT DOCUMENTS 5,796,011 A 8/1998 Keita et al.
2001/0037690 A1 11/2001 Bitto et al.

FOREIGN PATENT DOCUMENTS

| EP | 1 091 196 A2 | 4/2001 |
| EP | 1 091 196 A3 | 4/2001 |
| JP | 2001-304935 | 10/2001 |

*Primary Examiner*—Harshad Patel
(74) *Attorney, Agent, or Firm*—McGlew and Tuttle, P.C.

(57) ABSTRACT

Each of two flow tubes assumes an arcuate shape consisting of a central arcuate segment and two linear segments located on opposite sides of the central arcuate segment. The inside diameter of the flow tubes and the linear distance between end points of each of the flow tubes are determined on the basis of a target pressure loss arising from passage of a fluid to be measured through a manifold and the flow tube at the maximum flow rate, a target time phase difference between sine wave outputs from vibration sensors at the maximum flow rate, and a target natural frequency of the flow tubes. The length of the linear segments is selected so as to reduce thermal stress induced from an abrupt change in the temperature of the fluid to be measured, and the shape of the flow tubes is determined so as to reduce the vertical height of the flow tubes, so long as the thermal stress is substantially constant even when the length of the linear segments is varied. Thus, the shape of the flow tubes is determined in such a manner as to suppress, to a predetermined low value, stress arising upon abrupt change in the temperature of the fluid to be measured and as to be most compact.

5 Claims, 8 Drawing Sheets

Parameters of Arcuate Flow Tube

Parameters of Arcuate Flow Tube

Fixed Arc

Moment induced by Vertical Thermal Expansion

Influence of Dimensional Ratio h/L on Stress

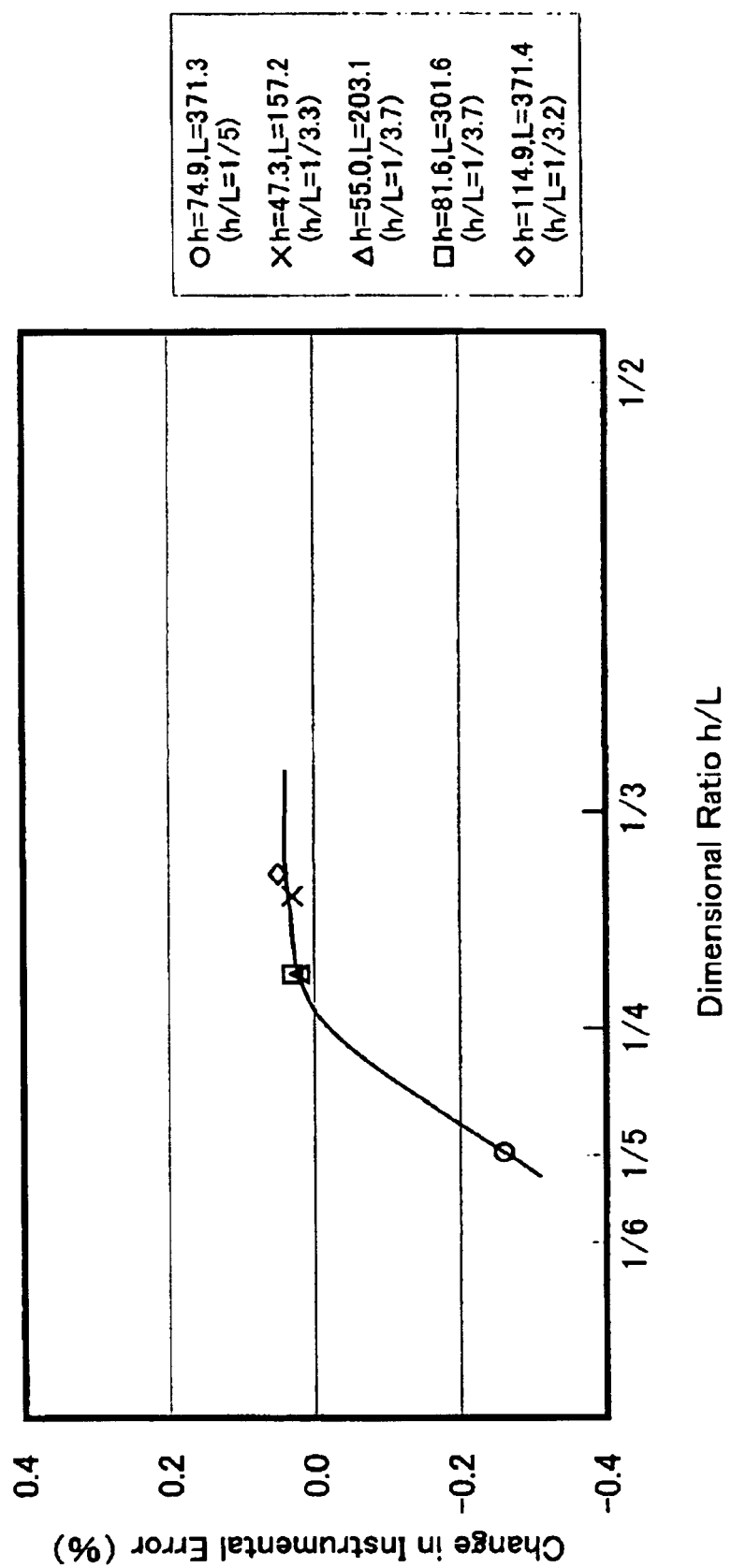

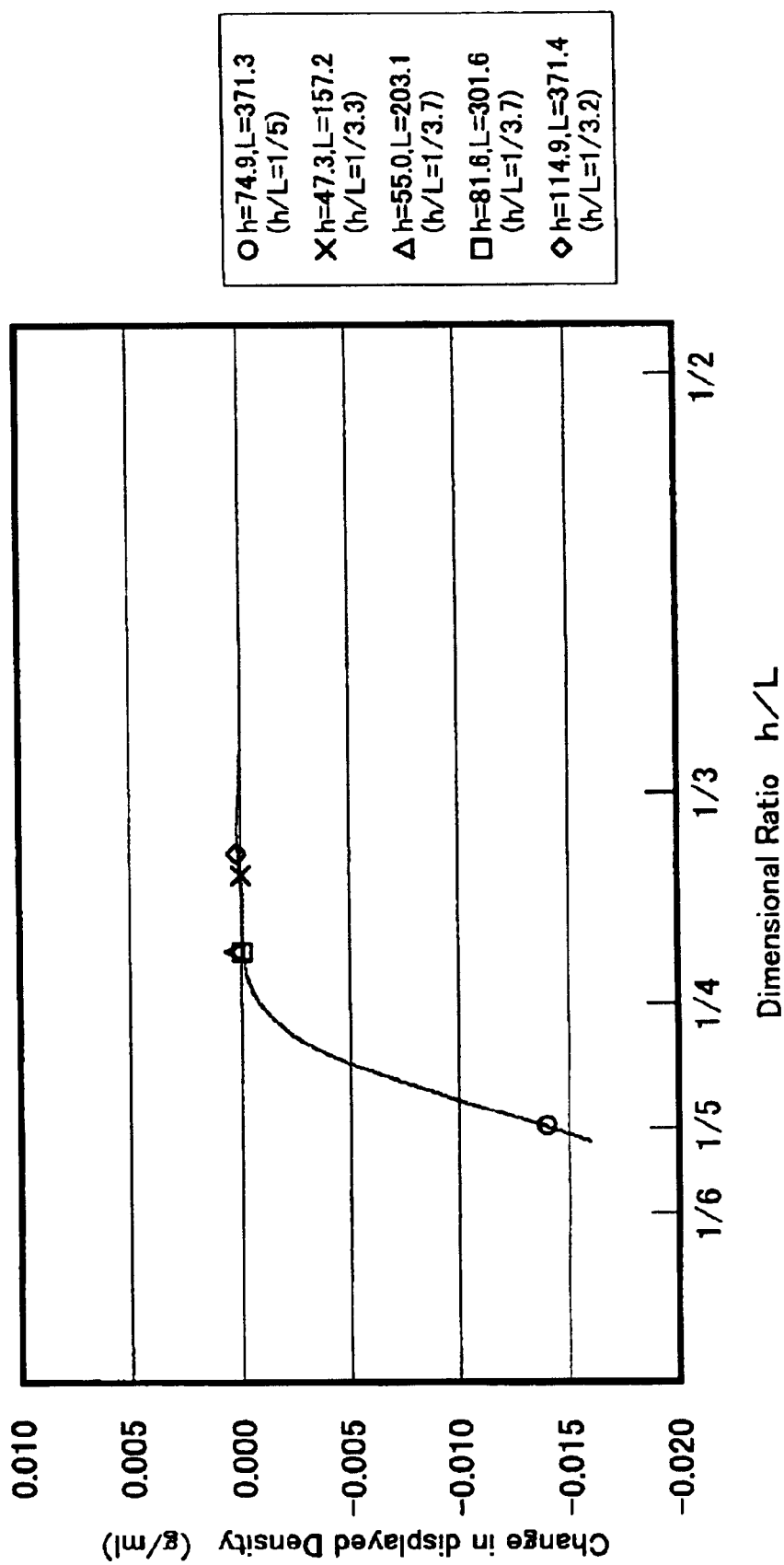

ARCH-SHAPED TUBE TYPE CORIOLIS METER AND METHOD FOR DETERMINING SHAPE OF THE CORIOLIS METER

TECHNICAL FIELD

The present invention relates to an arcuate-tube-type Coriolis flow meter using two parallel arcuate flow tubes and to a method for determining the shape of the same.

BACKGROUND ART

Conventionally, there has been known a mass flow meter (Coriolis flow meter) which employs the principle that, when a flow tube through which a fluid to be measured flows and which is supported at its opposite ends is vibrated about the support points in directions perpendicular to the direction of flow within the flow tube, a Coriolis force acting on the flow tube is proportional to the mass flow rate (hereinafter, the term "flow tube" refers to a flow tube to which vibrations are to be imparted).

Further, according to the known art, when two flow tubes arranged in parallel are resonantly driven at mutually opposite phases, and a fluid to be measured is caused to flow through the two flow tubes at the same rate, the natural frequency of the two flow tubes is constant at all times, regardless of the type of fluid or temperature variations; thus, the Coriolis flow meter can be operated effectively and consistently while being free from influence of external vibrations and ambient temperature.

Such a conventional Coriolis flow meter using two parallel flow tubes employs a driver composed of a coil and a magnet and disposed at central portions of the flow tubes. The driver resonantly drives the two flow tubes at mutually opposite phases. A pair of vibration sensors each composed of a coil and a magnet are disposed at longitudinally symmetrical positions with respect to the installation position of the driver so as to sense a phase difference proportional to a Coriolis force.

A fluid to be measured enters the Coriolis flow meter from an external pipe connected to the flow meter via an inlet flange and branches equally into the two flow tubes. The two flows of fluid merge at the outlet side of the two flow tubes, and the resultant merged fluid flows out to an external pipe connected to the flow meter via an outlet flange. Two-parallel-flow-tube-type Coriolis flow meters are classified as being of the curved-tube type or the straight-tube type.

A curved-tube-type Coriolis flow meter employing two parallel curved flow tubes utilizes and measures vibrations of flow tube leg portions extending laterally from a body of the flow meter. Therefore, a space for the laterally extending leg portions is required, thus raising a problem of increased size.

A straight-tube-type Coriolis flow meter employs two straight flow tubes extending in the direction of an external pipe. When the straight flow tubes supported at their opposite ends are vibrated at their central portions in a direction perpendicular to their axes, the displacement difference between the supported portions of the straight flow tubes and the central portions of the straight flow tubes is sensed in the form of a phase difference signal which is used to determine the mass flow rate. Thus, the straight-tube-type Coriolis flow meter has a simple, compact, strong configuration.

However, the straight-tube-type Coriolis flow meter requires fixed support for the flow tubes at their opposite ends and is thus affected by variations in temperature. Specifically, upon change in the temperature of a fluid to be measured, the temperature of the flow tubes immediately changes accordingly, whereas a stationary structure such as a housing for securing the flow tubes exhibits delay in temperature change. As a result, a difference in elongation arises between the flow tubes and the stationary structure, thereby inducing longitudinal stress. The stress causes a change in spring constant, which in turn leads to a change in the natural frequency of the flow tubes. In order to avoid the problem, the straight-tube-type Coriolis flow meter must employ stress absorption means such as diaphragms or bellows.

The problem of longitudinal elongation induced from change in temperature can be solved through impartment of an arcuate shape to the flow tube. U.S. Pat. No. 5,796,011 discloses an arcuate flow tube. FIG. 7 is a schematic view for explaining the operation of a conventional Coriolis flow meter having an arcuate flow tube. An arcuate flow tube can disperse stress and thus exhibits excellent vibration resistance. However, a conventional arcuate flow tube is connected to a manifold in the direction aligned with the axis of an external pipe. Therefore, as shown in the upper view of FIG. 7, in the process of manufacture, the flow tube must be bent at least three times; specifically, at a central portion represented by the letter R and at two opposite end portions represented by the letter r. Such bending work is particularly disadvantageous in manufacture of a Coriolis flow meter having two flow tubes, since the two flow tubes must be symmetrical to each other. The lower view of FIG. 7 shows two states of a vertically vibrating flow tube. As shown in the lower view, even node plates, which serve as nodes of vibration, may move vertically during vibration, resulting in a failure to carry out accurate measurement.

The above-mentioned U.S. Pat. No. 5,796,011 also discloses an arcuate flow tube as shown in FIG. 8. However, such a simple arcuate flow tube fails to establish linear connection to an inlet pipe or an outlet pipe, thereby failing to provide smooth connection.

DISCLOSURE OF THE INVENTION

In view of the foregoing, the present invention is to provide a simple, arcuate flow tube of a single bend while establishing straight connection to an inlet pipe and to an outlet pipe for smooth connection. In order to achieve this end, desirably, as shown in FIG. 6, the arcuate flow tube consists of a central arcuate segment and two linear segments located on opposite sides of the central arcuate segment, and an inlet pipe and an outlet pipe assume a predetermined elevation angle so as to be connected to the flow tube in an aligned condition. In this case, the shape of the flow tube must be designed not only so as to be compact, but also in consideration of thermal influence.

In view of the foregoing, an object of the present invention is to determine, for a Coriolis flow meter having two parallel, arcuate flow tubes each consisting of an arcuate segment and two linear segments, the shape of the flow tube so as to suppress, to a predetermined low value, stress arising upon abrupt change in the temperature of a fluid to be measured and so as to be most compact, thereby achieving excellent stress dispersion and vibration resistance.

The present invention provides an arcuate-tube-type Coriolis flow meter and a method for determining the shape of the arcuate-tube-type Coriolis flow meter, the flow meter including two parallel flow tubes; an inlet manifold for receiving a fluid to be measured from a fluid inlet and branching the fluid to be measured into the two flow tubes;

an outlet manifold for merging fluids flowing from the corresponding two flow tubes and releasing the merged fluid from a fluid outlet; a driver for resonantly driving the two flow tubes at mutually opposite phases; and a pair of vibration sensors disposed at longitudinally symmetrical positions with respect to the installation position of the driver and adapted to sense a phase difference proportional to a Coriolis force. Each of the two flow tubes assumes an arcuate shape including a central arcuate segment and two linear segments located on opposite sides of the central arcuate segment. The inside diameter of the flow tubes and the linear distance between end points of each of the flow tubes are determined on the basis of a target pressure loss arising from passage of the fluid through the manifold and the flow tube at the maximum flow rate, a target time phase difference between sine wave outputs from the paired vibration sensors at the maximum flow rate, and a target natural frequency of the flow tubes. The length of the linear segments is selected so as to reduce thermal stress induced from an abrupt change in the temperature of the fluid to be measured, and the shape of the flow tubes is determined so as to reduce the vertical height of the flow tubes, so long as the thermal stress is substantially constant even when the length of the linear segments is varied.

The present invention also provides an arcuate-tube-type Coriolis flow meter and a method for determining the shape of the arcuate-tube-type Coriolis flow meter, wherein the inside diameter of the flow tubes and the linear distance between end points of each of the flow tubes are determined on the basis of a target pressure loss arising from passage of the fluid through the manifold and the flow tube at the maximum flow rate, a target time phase difference between sine wave outputs from the paired vibration sensors at the maximum flow rate, and a target natural frequency of the flow tubes. The shape of the flow tubes is determined such that the dimensional ratio (h/L) of the vertical height (h) of the flow tubes to the linear distance (L) between the end points of each of the flow tubes is 1/4 to 1/3.

BRIEF DESCRIPTION OF DRAWINGS

FIG. 11 is a graph showing a change in instrumental error as measured for different dimensional ratios after abrupt change in temperature.

FIG. 12 is a graph showing a change in displayed density as measured for different dimensional ratios after abrupt change in temperature.

BEST MODE FOR CARRYING OUT THE INVENTION

Figure 1:
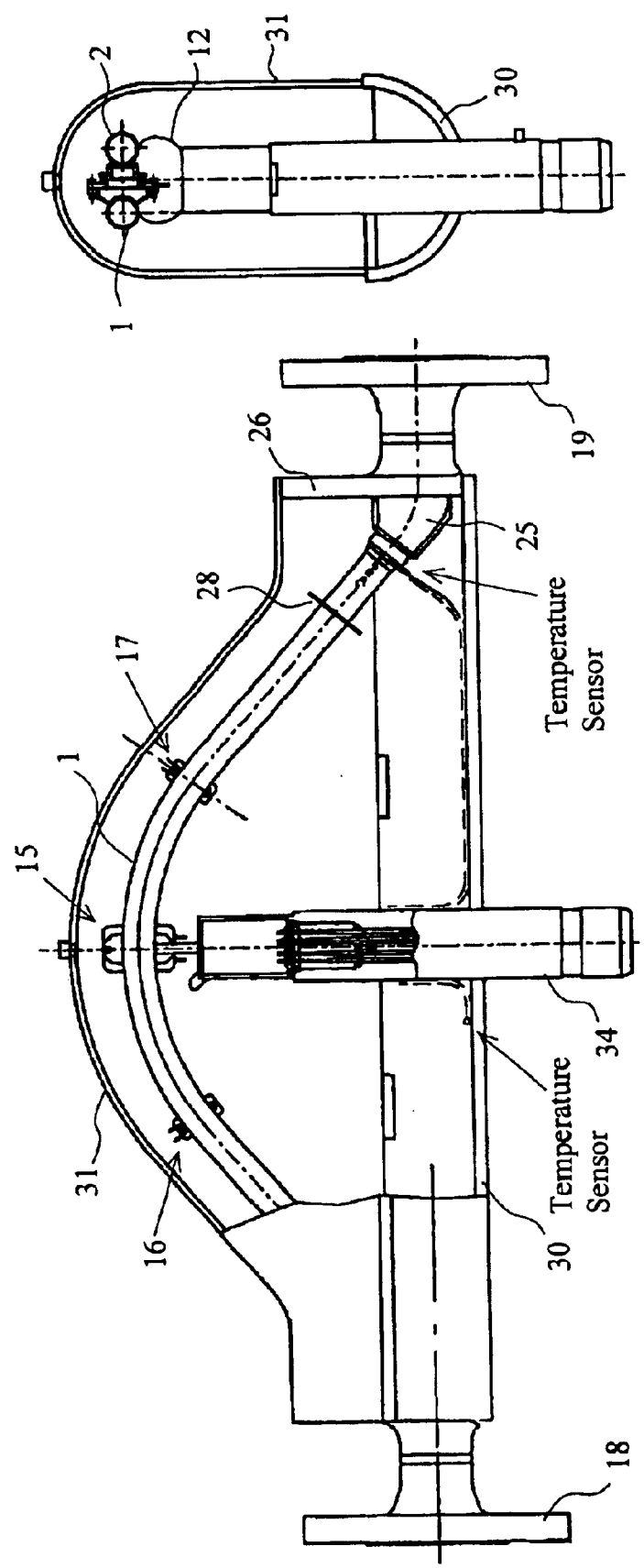
FIG. 1 is a view illustrating a Coriolis flow meter to which the present invention is applied, assuming that an inlet pipe and an outlet pipe are connected horizontally to the flow meter, wherein the left-hand view is a partially sectional front view, and the right-hand view is a cross-sectional side view (right-hand side view) taken at a central portion of the flow meter.

An arcuate-tube-type Coriolis flow meter using two parallel arcuate flow tubes according to the present invention will be described by way of example. FIG. 1 illustrates a Coriolis flow meter to which the present invention is applied, by means of a partially sectional front view (left-hand view) and a cross-sectional side view (right-hand side view) taken at a central portion thereof, on the assumption that an inlet pipe and an outlet pipe are horizontally connected to the flow meter. The illustrated Coriolis flow meter can be mounted horizontally or vertically. When the Coriolis flow meter is to be mounted horizontally, the central convex portions of the flow tubes may project either upward as shown in FIG. 1 or downward. However, when a gas is to be measured, the central convex portions of the flow tubes preferably project upward as illustrated, in order to prevent stagnation of liquid in the central convex portions. By contrast, when a liquid is to be measured, the convex portions preferably face downward, in order to prevent stagnation of bubbles in the central convex portions.

Flow tubes 1 and 2 of the illustrated Coriolis flow meter assume the same arcuately curved shape. Opposite end portions of each of the flow tubes 1 and 2 are joined to an inlet manifold and to an outlet manifold 25 by means of, for example, welding. The following description assumes that a fluid to be measured enters the flow meter from the left in FIG. 1 and leaves the flow meter to the right. The fluid to be measures enters the flow meter from an external pipe connected to the flow meter via a flange 18 and is equally branched into the two flow tubes 1 and 2 by means of the inlet manifold. Fluids flowing out from the flow tubes 1 and 2 merge together in the outlet manifold 25. The merged fluid flows out to an external pipe connected to the flow meter via a flange 19.

Since the illustrated Coriolis flow meter is of symmetrical structure in terms of the inflow half and the outflow half, only the outflow half of the flow meter will be described. The manifold 25 is smoothly and arcuately curved upward at a predetermined angle from its outlet (its connection portion to which the flange 19 is connected) and reaches connection ports to the flow tubes 1 and 2 are connected. In this manner, directing the tube connection ports of the manifold at an angle of elevation of the flow tubes allows connection of the manifold and each of the flow tubes in a smooth arcuate shape on the whole while each of the flow tubes is allowed to assume a simple shape of a single bend. The manifold establishes connection between the single outlet and two flow paths; i.e., the two flow tubes 1 and 2.

While the flow tubes 1 and 2, which play an important role in measuring vibrations, are each allowed to assume a simple shape of a single bend, the manifold copes with a complicated flow path change for directing the flow paths of the two flow tubes toward an external pipe. The flow tubes 1 and 2 can be fixedly joined to the manifold by means of, for example, welding; i.e., inclusion of a flexible portion is not required. The arcuate shape of the flow tubes absorbs thermal stress and is resistant to piping-related stress.

Node plates 28 are provided in the vicinity of the opposite ends of the flow tubes 1 and 2 so as to serve as vibration nodes when the flow tubes 1 and 2 are driven and so as to securely maintain the flow tubes 1 and 2 in a parallel condition. A point on the flow tube 1 or 2 where the flow tube is fixed by means of the node plate 28 serves as a first fulcrum of vibration, and an end of the flow tube 1 or 2 that is connected to the upper end of the inlet manifold or to the upper end of the outlet manifold 25 serves as a second fulcrum of vibration.

A driver 15 is provided at central portions of the flow tubes 1 and 2 such that, while a drive coil is attached to the flow tube 1 via a fixture, a drive magnet is attached to the flow tube 2 via a fixture. The drive coil is electrically connected to an external device of the Coriolis flow meter via a flexible printed board 12 and a wiring terminal portion 34. The wiring terminal portion 34 is supported by a base member 30 having a semicircular, cross-sectional shape and extends through the base member 30. A cover 31 is integrally joined to the base member 30 in such a manner as to define a hermetically sealed space in cooperation with flanges 26 of manifold sections. A pair of vibration sensors 16 and 17 are provided on longitudinally opposite sides of the driver 15 such that, while a sensor magnet is attached to the flow tube 1 via a fixture, a sensor coil is attached to the flow tube 2 via a fixture.

In operation, the driver 15 resonantly drives the two parallel flow tubes 1 and 2 at their central portions at mutually opposite phases. The paired vibration sensors 16 and 17 are provided on longitudinally opposite sides of the driver 15 and adapted to sense a phase difference proportional to a Coriolis force. The driver 15 and the paired vibration sensors 16 and 17 are disposed in an interspace between the axes of the flow tubes 1 and 2. In other words, as shown in FIG. 1, when the flow meter is viewed such that one flow tube located on the near side completely hides the other flow tube located on the far side, each of the driver 15 and the paired vibration sensors 16 and 17, which are disposed in the interspace between the two flow tubes, is disposed in such a manner that the center thereof is located on a line connecting the center axes of the two flow tubes. Thus, a drive force can be applied to the flow tubes along the line connecting the center axes of the two flow tubes. Also, a Coriolis force induced from the drive force can be sensed along the line connecting the center axes of the two flow tubes. Therefore, a moment of inertia induced from a vibrational inertia force is not produced.

As shown in FIG. 1, two temperature sensors are provided at the respective two positions. Variation in the distance between the opposite fixed ends of each of the two flow tubes influences vibration frequency and thus must be corrected. The illustrated apparatus carries out the correction by measuring a typical temperature of the base member 30 and estimating the elongation of the base member 30 from the measured typical temperature. Further, the temperature sensor located in the vicinity of a connection between the flow tubes and the manifold provides temperature for use in correcting variation in rigidity of the flow tube stemming from variation in the temperature of the flow tube.

The arcuate flow tube shown in FIG. 1 consists of the central arcuate segment and two linear segments located on opposite sides of the central arcuate segment. The inlet pipe and the outlet pipe assume a predetermined elevation angle so as to be connected to the flow tube in an aligned condition. In this case, the shape of the flow tube must be designed not only so as to be compact but also in consideration of thermal influence.

A method for determining the shape of a flow tube so as to suppress, to a predetermined low value, stress arising upon abrupt change in the temperature of a fluid to be measured and so as to be most compact will be described with reference to FIGS. 2 to 4.

Figure 2:
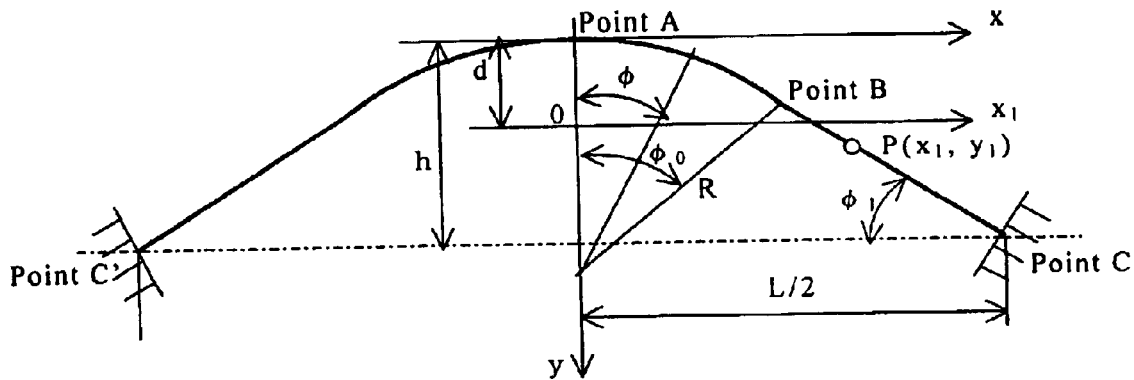
FIG. 2 is a view showing parameters of an arcuate flow tube.

In FIG. 2, points C' and C represent a point of connection between the flow tube and the inlet manifold and a point of connection between the flow tube and the outlet manifold, respectively; point A represents the vertex of the flow tube which is located between points C' and C; and point B represents a point of connection between the central arcuate segment and the linear segment. Point A serves as the origin of coordinates; the x-axis extends positively rightward from point A; and the y-axis extends positively downward from point A. $\phi$ represents an angle of an arbitrary point on the arcuate segment with respect to a line connecting point A and the center of arc of the arcuate segment; $\phi_0$ represents an angle of an end point (point B) of the arcuate segment with respect to the line; and R represents the radius of the arcuate segment. Further, h represents the height of the flow tube; L/2 represents half of the length of a straight line connecting points C' and C (linear distance between end points); and $\phi_1$ represents the angle which the straight line and the linear segment of the flow tube form.

In determination of the shape of the flow tube, the ratio (h/L) of the vertical height h of the flow tube to the linear distance L between end points of the flow tube is taken to be 1/3 to 1/4 (0.33 to 0.25). In view of the foregoing, the present invention assumes that a Coriolis meter has two parallel arcuate flow tubes which exhibit excellent stress dispersion and vibration resistance. A conventional curved flow tube usually has an h/L greater than 1.3. Needless to say, in the case of a straight flow tube, h is zero, and thus h/L is zero.

Further, the shape of the flow tube is determined on the assumption that the following target values are achieved. A target pressure loss arising from passage of a fluid through the manifold and the arcuate flow tube at the maximum flow rate is not greater than 1 bar (total of a pressure loss arising from the throttling effect of the inlet manifold, a pressure loss arising from the expanding effect of the outlet manifold, and a pressure loss arising from passage through an equivalent straight tube of the arcuate flow tube). Also, a target time phase difference between sine wave outputs from two tube sensor coils at the maximum flow rate is not less than 6 $\mu$S. The natural frequency of the flow tube is set to 250–400 Hz, which is higher than commercial frequencies.

On the above premises, the inside diameter $D_1$ of the flow tube and the linear distance L between end points of the flow tube are determined. Next, the thus-determined schematic shape of the arcuate flow tube is refined so as to reduce stress induced from an abrupt change in the temperature of a fluid to be measured. In summary, as expressed by Eq. (24), which will be described later, the maximum stress induced at a fixed end can be obtained. Since the maximum stress can be obtained in relation to the length L1 of the linear segment, the length L1 and the vertical height h of the flow tube that reduce the maximum stress can be obtained. This will be described in detail below.

As shown in FIG. 2, point A is the vertex of the arcuate flow tube; segment A-B is an arcuate tube segment (half); segment B-C is a linear tube segment; and points C and C' are fixed. From tube continuity, $\phi_0 = \phi_1$. The following analysis explains how to obtain thermal stress that arises in the flow tube when the temperature of a liquid flowing through the flow tube changes abruptly from t1 to t2 (abrupt change from t1 to t2). This analysis uses as the origin a point which is moved by d from point A in the direction of the y-axis; i.e., the elastic center (a point where moment induced from thermal expansion is 0). Coordinates with respect to the elastic center serving as the origin are represented by ($x_1$, $y_1$). That is, $x_1=x$ and $y_1=y-d$.

Figure 3:
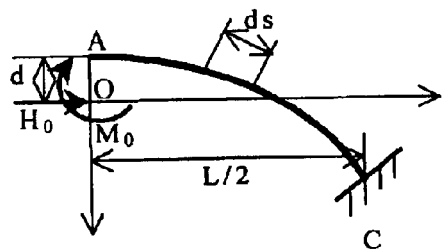
FIG. 3 is a view showing a fixed arc.
Figure 4:
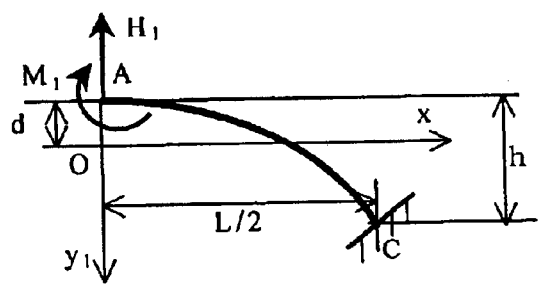
FIG. 4 is a view showing a moment induced by vertical thermal expansion.

According to Timoshenko, when the origin of coordinates is moved from point A to point 0 in the fixed arc as shown in FIG. 3; E represents Young's modulus of a tube material; I represents the geometrical moment of inertia of the flow tube as expressed by $\pi/64(Do^4-Di^4)$; and distance d is selected such that $y_1=y-d$ satisfies $$\int_0^S \frac{y_1 ds}{EI} = \int_0^S \frac{y-d}{EI} ds = 0, \tag{1}$$

distance d is expressed by $$d = \frac{\int_0^S (y ds/EI)}{\int_0^S (ds/EI)} \tag{2}$$

The first topic of discussion is elastic strain energy $U_x$ induced from expansion in the x-axis direction which, in turn, is induced from abrupt change in temperature. When s represents length as measured at an arbitrary position on an arch; ds represents infinitesimal length as measured at an arbitrary position on the arch; U represents elastic strain energy; $M_x$ represents moment in the x-axis direction; $M_y$ represents moment in the y-axis direction; N represents a compressive force acting on the flow tube; a represents the thermal expansion coefficient of a tube material; t represents the temperature or temperature difference of the flow tube; and compressive force $H_0$—which is a horizontal force acting at the elastic center (point O)—and bending moment $M_0$ are taken as redundant quantities, from the Castigliano's second theorem, Eqs. (3) and (4) hold:

$$\frac{\partial U_x}{\partial M_0} = \int_0^S \frac{M_y}{EI} \frac{\partial M_y}{\partial M_0} ds = 0 \tag{3}$$

$$\frac{\partial U_x}{\partial H_0} = \int_0^S \frac{M_y}{EI} \frac{\partial M_y}{\partial H_0} ds + \int_0^S \frac{N}{AE} \frac{\partial N}{\partial H_0} ds = \frac{atL}{2} \tag{4}$$

where $$M_y = M_0 + H_0 y_1 \quad N = H_0 \cos\phi \tag{5}$$

From the condition of the elastic center, $M_0=0$. Thus, $$H_0 = \frac{atL/2}{\int_0^S (y_1^2 ds/EI) + \int_0^S [(\cos^2\phi \, ds)/AE]} \tag{6}$$

Eqs. (5) and (6) yield a bending moment and a compressive force acting on an arbitrary cross section of the arcuate flow tube. The parameters of the arcuate flow tube as shown in FIG. 2 are substituted into Eq. (2), and Eq. (2) is solved for d. Then, $$d = \frac{\int_0^{\phi_0} R(1-\cos\phi) R d\phi + \int_{R(1-\cos\phi_0)}^h y \, dy/\sin\phi_1}{\int_0^{\phi_0} R d\phi + \int_{R(1-\cos\phi_0)}^h dy/\sin\phi_1} \tag{7}$$

where R represents the radius of the arcuate segment of the arcuate flow tube.

Therefore, the distance between vertex A and the elastic center is expressed by $$d = \frac{\frac{1}{2\sin\phi_1}\{h^2 - R^2(1-\cos\phi_0)^2\} + R^2(\phi_0 - \sin\phi_0)}{R\phi_0 + \frac{1}{\sin\phi_1}\{h - R(1-\cos\phi_0)\}} \tag{8}$$

Similarly, solving Eq. (6) yields $$H_0 = \frac{atL/2}{k_1 + k_2} \tag{10}$$

where $$k_1 = \frac{R}{EI}\{(R-d)^2\phi_0 + 2R(d-R)\sin\phi_0 + R^2\phi_0/2 + (R^2\sin 2\phi_0)/4\} + \frac{1}{3EI\sin\phi_1}[(h-d)^3 - \{R(1-\cos\phi_0) - d\}^3]$$

$$k_2 = \frac{1}{AE}\left\{\left(\frac{1}{2}\phi_0 + \frac{1}{4}\sin 2\phi_0\right)R + \frac{\cos^2\phi_0}{\sin\phi_1}[h - R(1-\cos\phi_0)]\right\} \tag{11}$$

Eqs. (5), (9), (10), and (11) yield a bending moment and compressive force N acting on an arbitrary cross section of the flow tube. Notably, A represents the cross-sectional area of the flow tube as expressed by $\pi \cdot (D_o^2 - D_i^2)/4$; $D_o$ represents the outside diameter of the flow tube; and $D_i$ represents the inside diameter of the flow tube.

Next, thermal expansion in the vertical direction will be discussed. When, as shown in FIG. 4, $H_1$ represents a redundant force, and $M_1$ represents a redundant moment, Eq. 12 holds:

$$M_x = M_1 + H_1 x \tag{12}$$

When $U_y$ represents elastic strain energy, from Castigliano's second theorem, $$\frac{\partial U_y}{\partial M_1} = \int_0^S \frac{M_x}{EI} \frac{\partial M_x}{\partial M_1} ds = \frac{1}{EI} \int_0^S (M_1 + H_1 x) ds = 0 \tag{13}$$

$$= \frac{1}{EI}\left\{\int_0^{\phi_0} (M_1 + H_1 R\sin\phi) R d\phi + \int_{R\sin\phi_0}^{L/2} (M_1 + H_1 x) dx/\cos\phi_1\right\} = 0$$

-continued and $$\frac{\partial U_y}{\partial H_1} = \int_0^S \frac{M}{EI} \frac{\partial M_x}{\partial H_1} ds = \alpha th \quad (14)$$

$$\int_0^S \frac{(M_1 + H_1 x)}{EI} x ds = \frac{1}{EI} \int_0^{\phi_0} (M_1 + H_1 R \sin\phi) R \sin\phi \cdot R d\phi +$$
$$\frac{1}{EI} \int_{R\sin\phi_0}^{L/2} (M_1 + H_1 x) x dx / \cos\phi_1 = \alpha th$$

Thus, $$M_1 = \frac{k_3}{k_5 + k_3 \cdot k_4} \alpha th \quad H_1 = \frac{1}{k_5 + k_3 \cdot k_4} \alpha th \quad (15)$$

where $$k_3 = \frac{\frac{1}{\cos\phi_1}\left(\frac{1}{2}R^2 \sin\phi_0 - \frac{1}{8}L^2\right) - (1-\cos\phi_0)R^2}{R\phi_0 + \frac{1}{\cos\phi_1}\left(\frac{L}{2} - R\sin\phi_0\right)} \quad (16)$$

$$k_4 = \frac{1}{EI}R^2(1-\cos\phi_0) + \frac{1}{EI\cos\phi_1}\left(\frac{L^2}{8} - \frac{R^2}{2}\sin^2\phi_0\right) \quad (17)$$

$$k_5 = \frac{1}{EI}R^3\left(\frac{1}{2}\phi_0 - \frac{1}{4}\sin^2\phi_0\right) + \frac{1}{EI\cos\phi_1}\left(\frac{L^3}{24} - \frac{R^3}{3}\sin^3\phi_0\right) \quad (18)$$

Since $M_x$ and $M_y$ are of the same direction, a resultant moment M is expressed by $$M = M_y + M_x \quad (19)$$

The maximum moment is induced at fixed end C. When $M_{max}$ represents the maximum moment, the maximum bending stress is expressed by $$\sigma_{M\,max} = \frac{M_{max}}{Z} \quad (20)$$

where Z represents the section modulus of the arc as expressed by $(\pi/32)\cdot(D_o^4 - D_i^4)/D_o$. Compressive stress acting at point C is expressed by $$\sigma_C = \frac{N}{A} = \frac{H_0 \cos\varphi_1}{A} \quad (21)$$

Thus, the resultant stress is expressed by $$\sigma_{max} = \sqrt{\sigma^2_{M\,max} c^2} \quad (22)$$

Notably, calculation results have revealed that $\sigma_c$ is as small as 2% to 3% of $\sigma_{M\,max}$ and thus ignorable. That is, $$\sigma_{max} \approx \sigma_{M\,max} \quad (23)$$

Therefore, the maximum stress arises at the fixed end and is expressed by $$\sigma_{max} \approx M_{max}/Z \quad (24)$$
$$= \frac{1}{Z} \cdot \alpha t \left\{ \frac{(h-d)}{2(k_1 + k_2)} \cdot L + \left( \frac{k_3}{k_5 + k_3 \cdot k_4} + \frac{L/2}{k_5 + k_3 \cdot k_4} \right) h \right\}$$

For example, when a flow tube having an opening diameter of 25 mm and made of stainless steel is used and has an inside diameter $D_i$ of 15 mm and a wall thickness of 0.75 mm, and the flow tube is subjected to an abrupt change in temperature of 110° C., from the dimensional geometry of FIG. 2, the following relationships hold:

$$R = \frac{L/2 - L_1 \cos\phi_1}{\sin\phi_0} \text{ and}$$
$$h = R - \sqrt{R^2 - (L/2 - L_1 \cos\phi_1)} + L_1 \sin\phi_1$$

Figure 5:
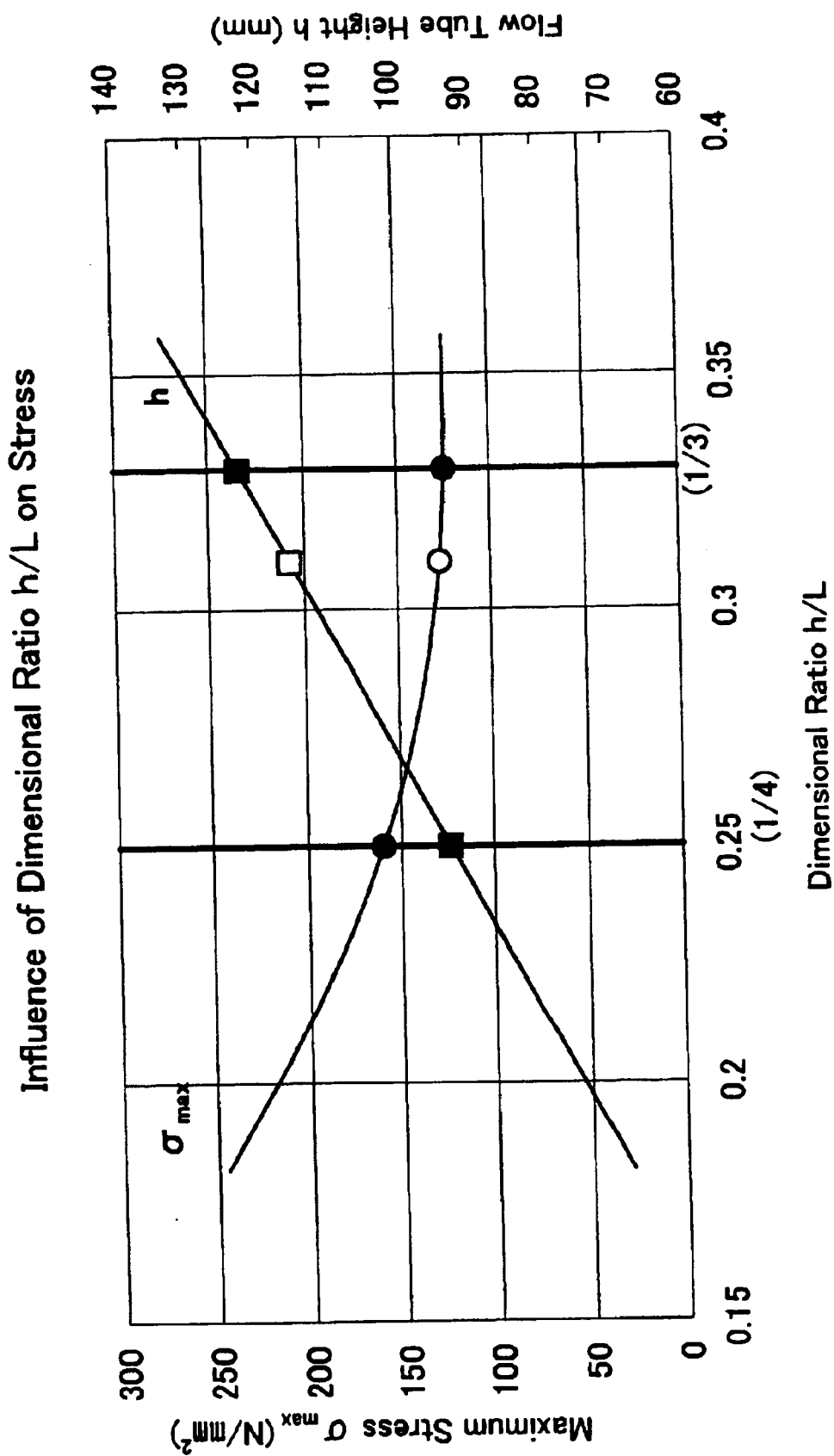
FIG. 5 is a graph showing maximum stress $\sigma_{max}$ and tube height h while length $L_1$ of a linear segment is varied.
Figure 6:
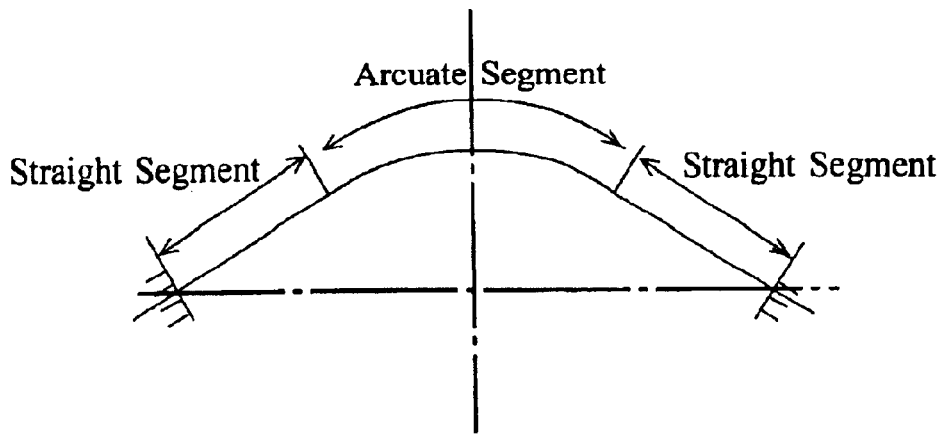
FIG. 6 is a view for explaining an arcuate flow tube including a central arcuate segment and two linear segments located on opposite sides of the central arcuate segment.
Figure 7:
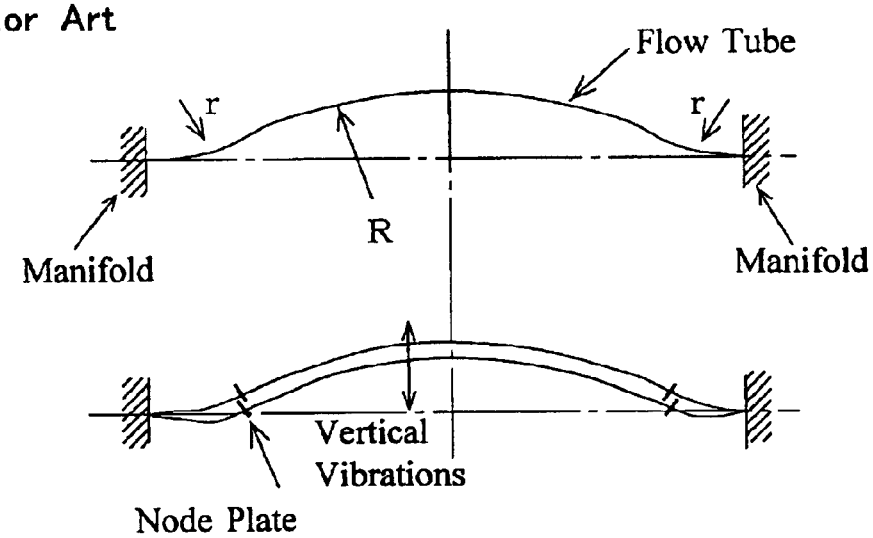
FIG. 7 is a conceptual view for explaining the operation of a Coriolis flow meter having a conventional arcuate flow tube.
Figure 8:
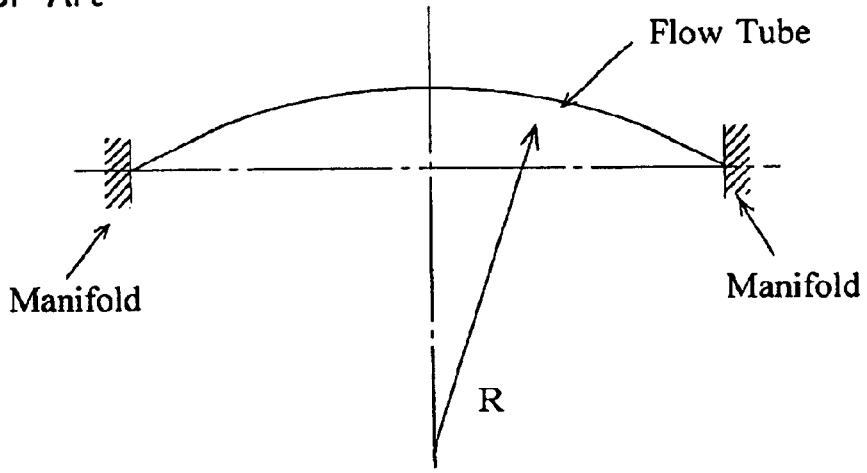
FIG. 8 is a view for explaining a conventional arcuate flow tube.
Figure 9:
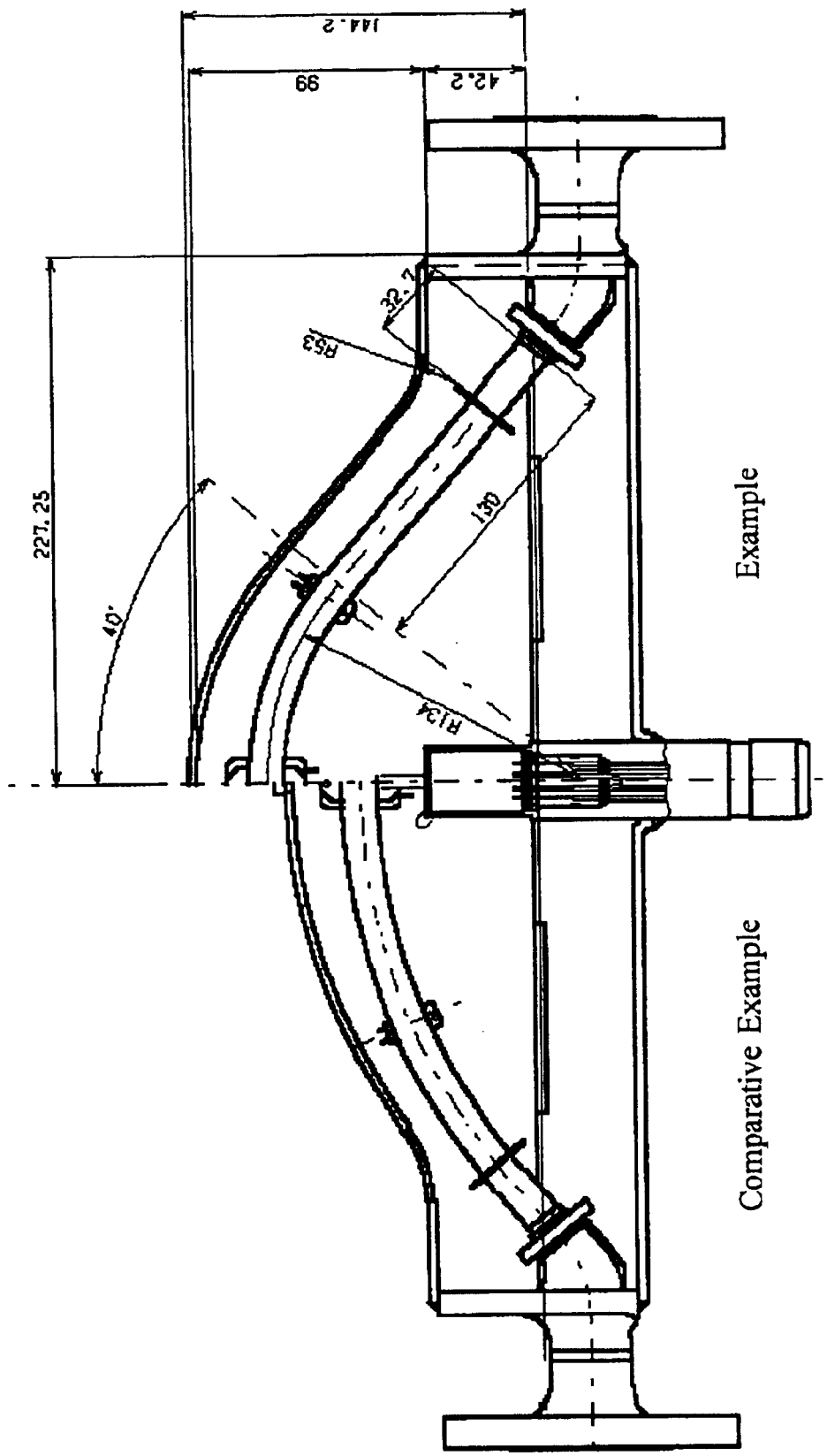
FIG. 9 is a view showing an Example of the present invention on the right-hand side and a Comparative Example which falls outside the scope of the invention, on the left-hands side.
Figure 10:
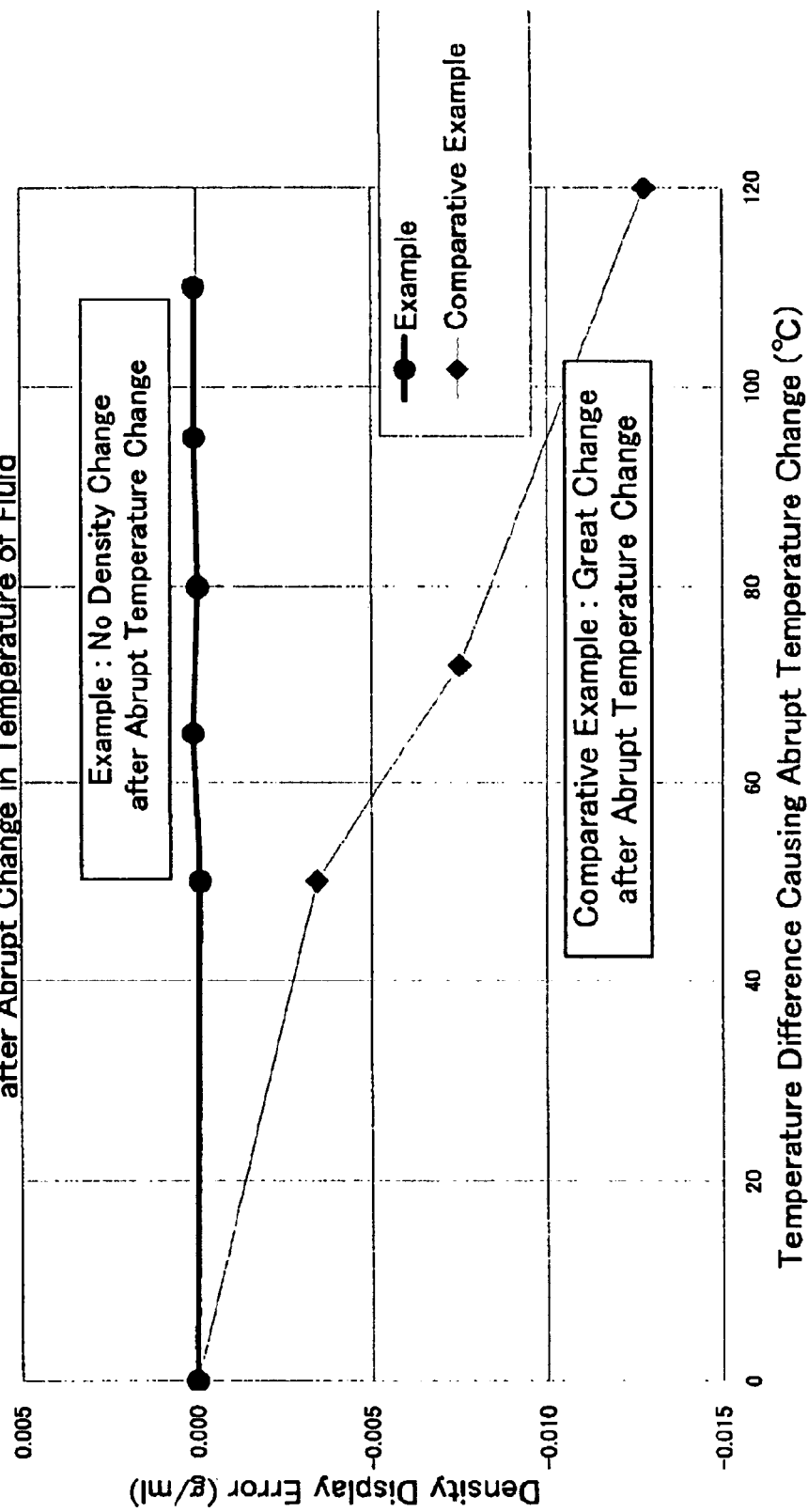
FIG. 10 is a graph showing a "change in density accuracy after abrupt change in temperature" with respect to the Example and the Comparative Example.

Thus, when dimensional ratio h/L is varied with L=371.4 mm and $\phi_1 = \phi_0 = 40°$, maximum stress $\sigma_{max}$ and flow tube height h assume the relationship as represented by the graph of FIG. 5. As is apparent from FIG. 5, maximum stress $\sigma_{max}$ converges to the minimum value (about 125 N/mm²) at a dimensional ratio h/L not less than 0.31. However, since h increases with dimensional ratio h/L, a dimensional ratio h/L of 0.31 is appropriate, since it provides low maximum stress and compact dimensions (as represented by the inline marks in FIG. 5). A device according to the present invention that is designed on the basis of a dimensional ratio h/L of 0.31 is shown in FIGS. 9 and 10 as Example. A dimensional ratio h/L of 0.31 is optimum; however, as shown in FIG. 5, in a dimensional-ratio-h/L range of 1/4 to 1/3, maximum stress $\sigma_{max}$ is substantially minimal, and the tube height h is sufficiently low, thereby providing a compact structure. As the dimensional ratio h/L decreases, the maximum stress increases. However, at an h/L not less than 1/4, the maximum stress can be suppressed to 1.3 $\sigma_{min}$, where $_{min}$ is a stress at an h/L of 1/3.

FIG. 9 shows, for comparison, the Example of the present invention (L1=130 mm, h=115 mm, h/L=0.31) on the right-hand side and a Comparative Example which falls outside the scope of the invention (L1=20 mm, h=75 mm, h/L=1/5), on the left-hand side.

FIG. 10 is a graph showing "change in density accuracy after abrupt change in temperature" with respect to the Example and the Comparative Example. FIG. 10 shows the measurement results of density accuracy as measured when the temperature of a fluid is returned to the room temperature after having been abruptly changed by a temperature difference taken along the horizontal axis of the graph (after having subjected to abrupt change). As shown in FIG. 10, the Example does not show involvement of error in density-accuracy measurements even when the temperature of a fluid is changed abruptly by a great temperature difference, whereas the Comparative Example indicates that density display error increases with the degree of an abrupt change in temperature.

FIG. 11 shows a change in instrumental error as measured for different dimensional ratios after abrupt change in temperature. FIG. 11 shows data obtained through actual measurement by use of flow meters having dimensional features as shown on the right-hand margin of the view. Conceivably, an abrupt change in temperature in the course of using a flow meter arises when cleaning (steam cleaning) is performed. During the cleaning, the temperature of a flow tube abruptly increases to about 130° C.; i.e., the flow tube is abruptly subjected to a temperature difference of up to 110° C. relative to a room temperature of, for example, 20° C. Thus, in the experiment, a temperature difference of 110° C. was imposed on the tested flow meters. According to the results of the experiment, the flow meters that satisfy $1/4 \leq h/L \leq 1/3$ show almost no change in instrumental error after abrupt change in temperature, whereas the flow meter having an h/L of 1/5, which falls outside an h/L range of 1/4 to 1/3, shows a change in instrumental error of not less than −0.2%. A change in instrumental error of −0.2% is great for a Coriolis flow meter and falls outside the guaranteed accuracy of a flow meter (generally, a Coriolis mass flow meter has an instrumental accuracy of about ±0.2%).

FIG. 12 shows the results of measurement of "change in displayed density" in place of "change in instrumental error" of FIG. 11. FIG. 12 shows a similar tendency to that of FIG. 11. The flow meter having an h/L of 1/5 shows a great change in displayed density which falls outside the guaranteed accuracy (generally, a density meter has a guaranteed accuracy of about ±0.002 g/ml).

The results of measurement shown in FIGS. 11 and 12 confirm that, at an h/L not greater than 1/4, instrumental error and displayed density change abruptly. Conceivably, the flow meter having an h/L of 1/5 suffered plastic deformation since an abrupt change in temperature caused flow tube stress to exceed elastic limit; as a result, mechanical characteristics of the flow tube changed with a resultant change in the period of the flow tube, thereby leading to a change in instrumental error and in displayed density.

Industrial Applicability

The present invention can determine the shape of a flow tube so as to suppress, to a predetermined low value, stress arising upon abrupt change in the temperature of a fluid to be measured and so as to be most compact.

The present invention employs two parallel, arcuate flow tubes each consisting of an arcuate segment and two linear segments, thereby achieving excellent stress dispersion and vibration resistance.

What is claimed is:

1. An arcuate-tube-type Coriolis flow meter including two parallel flow tubes, an inlet manifold for receiving a fluid to be measured from a fluid inlet and branching the fluid to be measured into the two flow tubes, an outlet manifold for merging fluids flowing from the corresponding two flow tubes and releasing the merged fluid from a fluid outlet, a driver for resonantly driving the two flow tubes at mutually opposite phases, and a pair of vibration sensors disposed at longitudinally symmetrical positions with respect to the installation position of the driver and adapted to sense a phase difference proportional to a Coriolis force, wherein each of the two flow tubes including a central arcuate segment and two linear segments located on opposite sides of the central arcuate segment is made up in an arcuate shape;

the inside diameter of the flow tubes and a linear distance between end points of each of the flow tubes are determined on the basis of a target pressure loss arising from passage of the fluid through the manifold and the flow tube at the maximum flow rate, a target time phase difference between sine wave outputs from the paired vibration sensors at the maximum flow rate, and a target natural frequency of the flow tubes; and the length of the linear segments is selected so as to reduce thermal stress induced from an abrupt change in the temperature of the fluid to be measured, and the shape of the flow tubes is determined so as to reduce the vertical height of the flow tubes, so long as the thermal stress is substantially constant even when the length of the linear segments is varied.

2. An arcuate-tube-type Coriolis flow meter including two parallel flow tubes, an inlet manifold for receiving a fluid to be measured from a fluid inlet and branching the fluid to be measured into the two flow tubes, an outlet manifold for merging fluids flowing from the corresponding two flow tubes and releasing the merged fluid from a fluid outlet, a driver for resonantly driving the two flow tubes at mutually opposite phases, and a pair of vibration sensors disposed at longitudinally symmetrical positions with respect to the installation position of the driver and adapted to sense a phase difference proportional to a Coriolis force, wherein each of the two flow tubes including a central arcuate segment and two linear segments located on opposite sides of the central arcuate segment is made up in an arcuate shape;

the inside diameter of the flow tubes and a linear distance between end points of each of the flow tubes are determined on the basis of a target pressure loss arising from passage of the fluid through the manifold and the flow tube at the maximum flow rate, a target time phase difference between sine wave outputs from the paired vibration sensors at the maximum flow rate, and a target natural frequency of the flow tubes; and the shape of the flow tubes is determined such that the dimensional ratio (h/L) of the vertical height (h) of the flow tubes to the linear distance (L) between the end points of each of the flow tubes is 1/4 to 1/3.

3. An arcuate-tube-type Coriolis flow meter as described in claim 2, wherein the length of the linear segments is selected so as to reduce thermal stress induced from an abrupt change in the temperature of the fluid to be measured, and the shape of the flow tubes is determined so as to reduce the vertical height of the flow tubes, so long as the thermal stress is substantially constant even when the length of the linear segments is varied.

4. A method for determining the shape of an arcuate-tube-type Coriolis flow meter having two parallel flow tubes, an inlet manifold for receiving a fluid to be measured from a fluid inlet and branching the fluid to be measured into the two flow tubes, an outlet manifold for merging fluids flowing from the corresponding two flow tubes and releasing the merged fluid from a fluid outlet, a driver for resonantly driving the two flow tubes at mutually opposite phases, and a pair of vibration sensors disposed at longitudinally symmetrical positions with respect to the installation position of the driver and adapted to sense a phase difference proportional to a Coriolis force, said method comprising steps of:

making up in an arcuate shape each of the two flow tubes including a central arcuate segment and two linear segments located on opposite sides of the central arcuate segment;

determining the inside diameter of the flow tubes and a linear distance between end points of each of the flow tubes on the basis of a target pressure loss arising from passage of the fluid through the manifold and the flow tube at the maximum flow rate, a target time phase difference between sine wave outputs from the paired vibration sensors at the maximum flow rate, and a target natural frequency of the flow tubes; and selecting the length of the linear segments so as to reduce thermal stress induced from an abrupt change in the temperature of the fluid to be measured, and determining the shape of the flow tubes so as to reduce the vertical height of the flow tubes, so long as the thermal stress is substantially constant even when the length of the linear segments is varied.

5. A method for determining the shape of an arcuate-tube-type Coriolis flow meter having two parallel flow tubes, an inlet manifold for receiving a fluid to be measured from a fluid inlet and branching the fluid to be measured into the two flow tubes, an outlet manifold for merging fluids flowing from the corresponding two flow tubes and releasing the merged fluid from a fluid outlet, a driver for resonantly driving the two flow tubes at mutually opposite phases, and a pair of vibration sensors disposed at longitudinally symmetrical positions with respect to the installation position of the driver and adapted to sense a phase difference proportional to a Coriolis force, said method comprising steps of:

making up in an arcuate shape each of the two flow tubes including a central arcuate segment and two linear segments located on opposite sides of the central arcuate segment;

determining the inside diameter of the flow tubes and a linear distance between end points of each of the flow tubes on the basis of a target pressure loss arising from passage of the fluid through the manifold and the flow tube at the maximum flow rate, a target time phase difference between sine wave outputs from the paired vibration sensors at the maximum flow rate, and a target natural frequency of the flow tubes; and determining the shape of the flow tubes such that the dimensional ratio (h/L) of the vertical height (h) of the flow tubes to the linear distance (L) between the end points of each of the flow tubes is 1/4 to 1/3.

* * * * *